United States Patent [19]

Inoue et al.

[11] Patent Number: 5,101,398
[45] Date of Patent: Mar. 31, 1992

[54] DEVICE FOR MAGNETICALLY GUIDING MOVEMENT OF A MOVING BODY SUCH AS AN OPTICAL HEAD

[75] Inventors: Hiroshi Inoue; Hiroto Kitai, both of Tokyo, Japan

[73] Assignee: Canon Kabushiki Kaisha, Tokyo, Japan

[21] Appl. No.: 728,314

[22] Filed: Jul. 8, 1991

Related U.S. Application Data

[63] Continuation of Ser. No. 311,278, Feb. 16, 1989, abandoned.

Foreign Application Priority Data

Feb. 19, 1988 [JP] Japan ................. 63-036991
Feb. 19, 1988 [JP] Japan ................. 63-036992

[51] Int. Cl.⁵ .............................................. G11B 7/00
[52] U.S. Cl. ................................... 369/244; 369/251; 369/255; 310/90.5
[58] Field of Search ............... 310/12, 90.5; 360/75, 360/101, 105, 106, 107; 369/44.14, 244, 249, 251, 255

[56] References Cited

U.S. PATENT DOCUMENTS

| | | | |
|---|---|---|---|
| 3,626,113 | 12/1971 | Jones et al. | 360/86 |
| 3,771,797 | 11/1973 | Braun | 369/255 X |
| 4,455,641 | 6/1984 | Sliski | 369/249 |
| 4,926,082 | 5/1990 | Barnes | 310/90.5 |

*Primary Examiner*—Robert L. Richardson
*Attorney, Agent, or Firm*—Fitzpatrick, Cella, Harper & Scinto

[57] ABSTRACT

An optical information recording-reproducing apparatus includes an optical head unit, a holding device, a moving device and a guide shaft. The optical head unit effects recording and/or reproduction of information on an optical information recording medium. The holding device holds the optical information recording medium. The holding device includes a guide portion and a magnetic field producing device provided near the lower portion thereof. The moving device moves the holding device relative to the optical head unit. The guide shaft, formed of a magnetic material, guides the holding device for movement in a predetermined direction.

31 Claims, 7 Drawing Sheets

DEVICE FOR MAGNETICALLY GUIDING MOVEMENT OF A MOVING BODY SUCH AS AN OPTICAL HEAD

This application is a continuation of prior application, Ser. No. 07/311,278 filed Feb. 16, 1989, now abandoned.

BACKGROUND OF THE INVENTION

1. Field of the Invention

This invention relates to a moving apparatus for a moving body, and particularly, to a moving apparatus for a moving body which can accomplish accurate control of the movement speed of the moving body. Such a moving apparatus is utilized, for example, for the movement of an optical head and an optical information recording medium in an optical information recording-reproducing apparatus.

2. Related Background Art

Magnetic and optical methods are known for an information recording-reproducing apparatus in which an optical information recording medium and an optical head are reciprocally moved relative to each other to thereby accomplish information recording and/or reproduction, and in recent years, attention has been paid to an optical method using a light beam.

As the types of recording media in such an optical information recording-reproducing apparatus, there are an optical disk which is a disk-like recording medium that is rotated, an optical card which is a card-like recording medium that is reciprocally moved, and an optical tape. These have their own merits and demerits and are properly used depending on the purpose, use, etc., and above all, the optical card is finding widening use because of its ease of manufacture, its good portability and its good accessibility.

Various methods of causing a light beam to scan the optical card have been conceived, and a system whereby the applied position of the light beam is linearly moved on a recording medium relative thereto and reciprocally moved, and the applied position of the beam is moved relative to the recording medium in a direction orthogonal to the reciprocal movement to thereby accomplish scanning has advantages such as simplicity of the overall mechanism and the ease with which accuracy is obtained.

However, this system suffers from problems, with respect to performance such as the inconsistent speed and vibration including the jitter resulting from the use of a timing belt and problems with respect of to cost attributable to the necessity of using a motor of high performance and the great number of parts of high accuracy. Recently, from such viewpoints, a system using a linear motor of the voice coil type as shown in FIGS. 1A and 1B of the accompanying drawings has been proposed as drive means for reciprocal movement. FIG. 1A is a cross-sectional view in a direction indicated by double-head arrow Y which is the direction of relative reciprocal movement, and FIG. 1B is a cross-sectional view in a direction indicated by double-head arrow X which is a direction perpendicular to the direction Y which is the direction of relative reciprocal movement.

In FIG. 1, a carriage 1, on which an optical card C which is an optical information recording medium is placed, has a holding mechanism 2 for the optical card C on the upper surface thereof, and slide bearings 3 provided in the lower portion thereof are slidably fitted to two slide shafts 5 fixed to an apparatus body 4 and are supported for movement in the direction Y. A voice coil 6 is mounted between the two slide shafts 5 and is adapted to move in the direction Y as a unit with the carriage 1. On the upper and lower portions of the voice coil 6, yokes 7 and 8 having their opposite ends fixed to the apparatus body 4 are disposed along the direction Y, and are coupled to iron pieces 10 and 11 with the opposite ends of a yoke 9 extending through the voice coil 6 to thereby constitute a magnetic circuit. Permanent magnets 12 and 13 are mounted on the yokes 7 and 8 in such a manner that their N or S poles are opposed to each other.

In the above-described construction, when an electric current is supplied to the voice coil 6, there is obtained a drive force in the direction Y and therefore, by reversing this electric current, reciprocal movement of the carriage 1 becomes possible. Accordingly, an optical head for effecting information recording and/or reproduction on an upper medium, not shown, is moved in the direction X and a track on the optical card C is selected and at the same time, the carriage 1 is reciprocally moved in the direction Y, whereby the medium surface of the optical card C is scanned by a light beam.

Since in the optical information recording-reproducing apparatus of this type, it is necessary to enhance the movement speed of the optical card, a linear encoder is used to effect speed servo control by a frequency/voltage converter or speed servo control by PLL (phase locked loop).

Heretofore, slide, bearings such as linear ball bearings or synthetic resin of a fluorine series have been used as the slide bearings 3 for supporting the reciprocal movement as described above. However, the linear ball bearings require the high accuracy of the slide shafts 5, and are high in cost, and the synthetic resin of the fluorine series are low in cost, but it is difficult to obtain sufficiently low frictional resistance and wear proof from them. Also, it is desirable that the weight of the carriage 1 be as light as possible to shorten the time it takes to reach a desired speed. However, in the case of light weight, it becomes difficult, due to click slip that occurs during a low speed, to enhance the gain of a speed servo system, and this leads to the problem that the speed cannot be maintained sufficiently constant. This problem that sufficiently constant speed cannot be kept, during a low speed is due to the magnitude of mechanical resistance occurring in the direction of movement of the carriage.

The carriage on which the optical card is placed has been described above as an example, and the above-noted problem likewise arises when the optical head is moved.

SUMMARY OF THE INVENTION

It is the object of the present invention to overcome the above-noted problem peculiar to the prior art and to provide a moving apparatus for a moving body in which mechanical resistance occurring in the direction of movement of the moving body is small.

The above object of the present invention can be achieved by a moving apparatus for a moving body comprising:

a moving body having a guide portion having magnetic field producing means provided near the lower portion thereof;

moving means for moving the moving body in a predetermined direction; and a guide shaft for guiding the moving body for movement in the predetermined direction, the guide shaft being formed of a magnetic material.

DESCRIPTION OF THE PREFERRED EMBODIMENTS

Figure 1A:
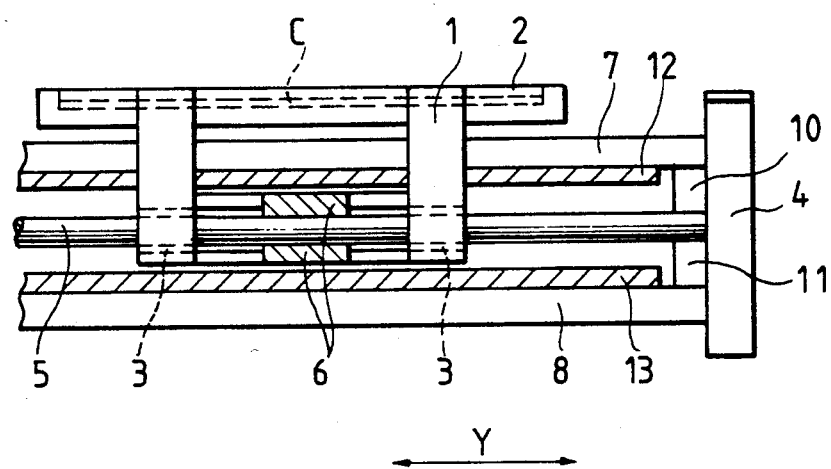
FIGS. 1A and 1B are cross-sectional views of a moving apparatus for an optical information recording medium in an optical information recording-reproducing apparatus according to the prior art.
Figure 1B:
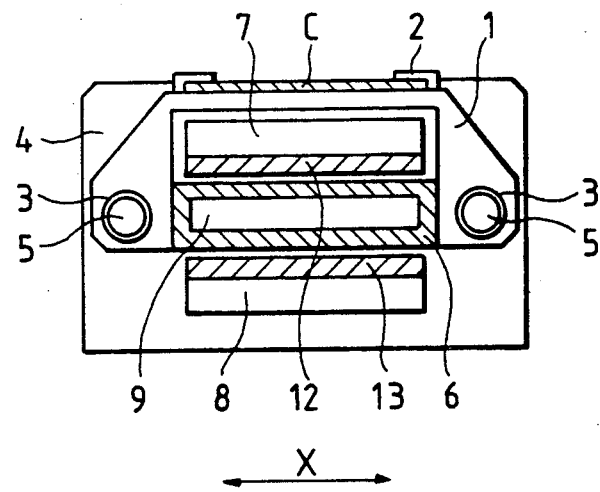

The moving apparatus of the present invention will hereinafter be described in detail on the basis of an embodiment used in an optical information recording-reproducing apparatus shown in FIGS. 2 and 3. In FIGS. 2 and 3, reference numerals similar to those in FIG. 1 designate similar or equivalent members and therefore, those members need not be described.

Figure 2A:
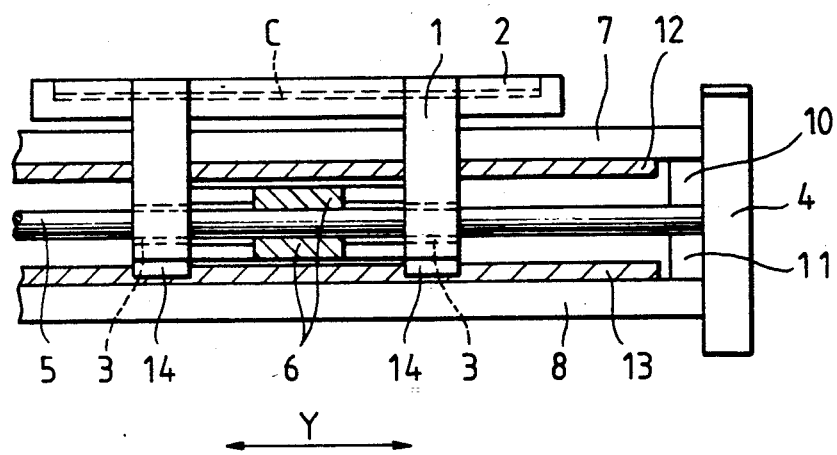
FIGS. 2A, 2B and 2C show an embodiment in which the moving apparatus of the present invention is used in an optical information recording-reproducing apparatus.
Figure 2B:
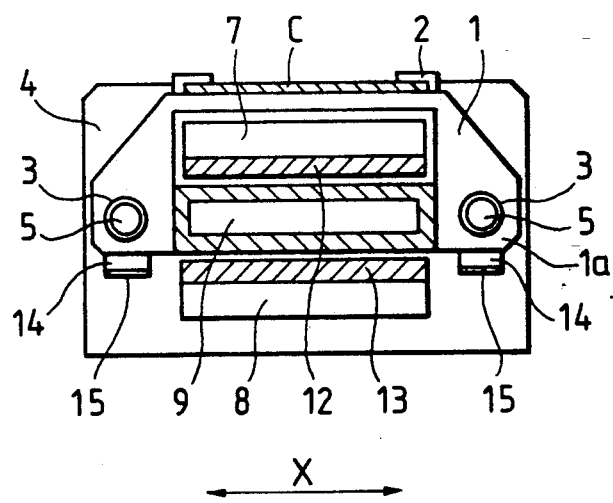
Figure 2C:
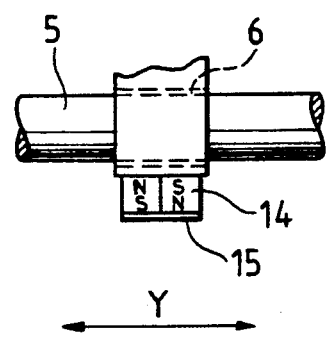

FIGS. 2A, 2B and 2C show a first embodiment, FIG. 2A being a side view, FIG. 2B being a cross-sectional view, and FIG. 2C being an enlarged view of the vicinity of the slide bearings 3. In these figures, the direction Y is the direction of movement of the carriage, and the direction X is a direction perpendicular to the direction Y. The two slide shafts 5, which are guide shafts, are made of iron which is a magnetic material, and permanent magnets 14 and iron pieces 15 as magnetic field producing means are mounted under the slide shafts 3 which are guide portions provided on the carriage 1.

Accordingly, magnetic flux produced from the permanent magnets 14 pass through the guide shafts 5 and form a magnetic circuit and therefore, magnetic attraction acts between the permanent magnets 14 and the slide shafts 5. The carriage 1 is pushed upwardly by this magnetic attraction and thus, the pressure force applied to the slide shafts 5 by the gravity of the carriage 1 is decreased.

Also, the portion 1a of the carriage 1 which is near the slide bearings is formed of a non-magnetic material. This is causes the magnetic fluxes produced from the permanent magnets 14 to act efficiently on the slide shafts 5.

Generally, if the mechanical accuracy of the slide shafts 5 and the slide bearings 3 is kept practically sufficient, when roulons are used, 95% or more of the mechanical load in the direction of movement of the carriage 1 is due to friction the pressure force by the gravity thereof produced. Therefore, by adjusting the dimensions of the permanent magnets 14 and the strength of the magnetic flux, it becomes possible to reduce the pressure force and decrease the mechanical load to the order of 30%.

According to the experiment, when the weight of an carriage 1 is about 70 g and the mechanical resistance in the direction of movement, is about 7 g, it is difficult to obtain a gain to provide nearly stably control at a speed of 60 mm/sec. with speed servo control which uses PLL and a frequency/voltage converter. If the inertial mass of the carriage 1 is increased and the weight thereof is on the order of 100 g, there can be obtained a gain for, suppressing jitter at 60 Hz by several percent while, on the other hand, the rising time during high speed increases. However, according to the present embodiment, it becomes possible to control jitter at 60–70 Hz at 60 mm/sec. to about 2%.

Figure 3A:
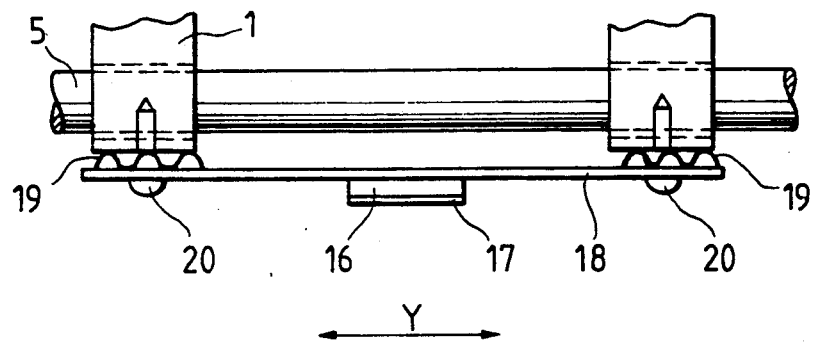
FIGS. 3A and 3B show another embodiment in which the moving apparatus of the present invention is used in an optical information recording-reproducing apparatus.
Figure 3B:
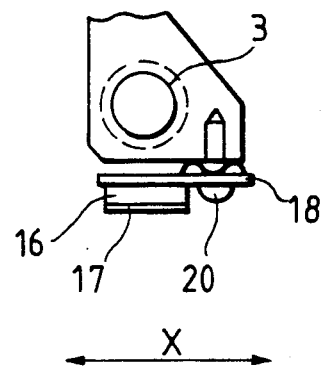

FIGS. 3A and 3B show a second embodiment. In FIGS. 3A and 3B, reference numerals similar to those in FIG. 2 designate similar or equivalent members and therefore, those members need not be described. A permanent magnet 16 and an iron piece 7 are fixed to the underside of a plate member 18 formed of a non-magnetic material, and the plate member 18 is mounted under two slide bearings 3 supporting the carriage, by screws 20 through spring washers 19.

In this case, by tightening or loosening the screws 20, it is possible to adjust the distance between the slide shaft 5 and the permanent magnet 16 to obtain optimum magnetic attraction for suppressing the mechanical load.

The gist of the present invention shown in the above-described embodiments is a moving apparatus for a moving body in which the carriage, which is a moving body, is movably supported by slide bearings grinded by slide shafts, and the carriage is moved on the slide shafts by a voice coil type linear motor, characterized in that the slide shafts are formed of a magnetic material, permanent magnets are mounted below the slide bearings, the magnetic force of the permanent magnets is caused to act on the slide shafts and the slide bearings are adapted to cause a thrust to act upwardly on the slide shafts.

Figure 4:
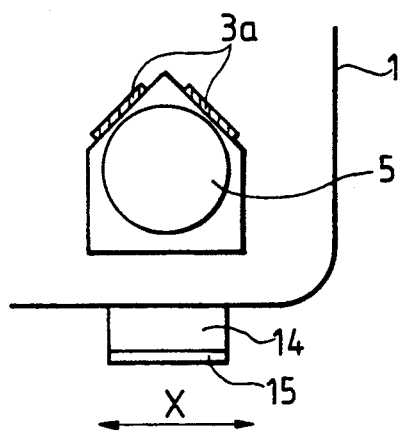
FIG. 4 shows still another embodiment in which the moving apparatus of the present invention is used in an optical information recording-reproducing apparatus, and is an enlarged view of a guide portion.

FIG. 4 shows a modification of the guide portion. In FIG. 4, reference numerals similar to those in FIG. 2 designate similar or equivalent members and therefore, those members need not be described. In FIG. 4, the reference character 3a designates a sliding sheet formed of a low-friction material adhesively secured to a slide grind portion having a substantially V-shaped recess. The sliding sheet 3a is in direct sliding contact with the slide shaft 5. Again, in such a case, by providing magnetic field producing means below the guide portion, it is possible to decrease the mechanical resistance in the direction of movement of the carriage 1.

The embodiments shown above have been described with respect to a case wherein an optical information recording medium is moved, but, of course, the present invention is also applicable to a case wherein an optical head is moved. An example of this will hereinafter be described.

Figure 5A:
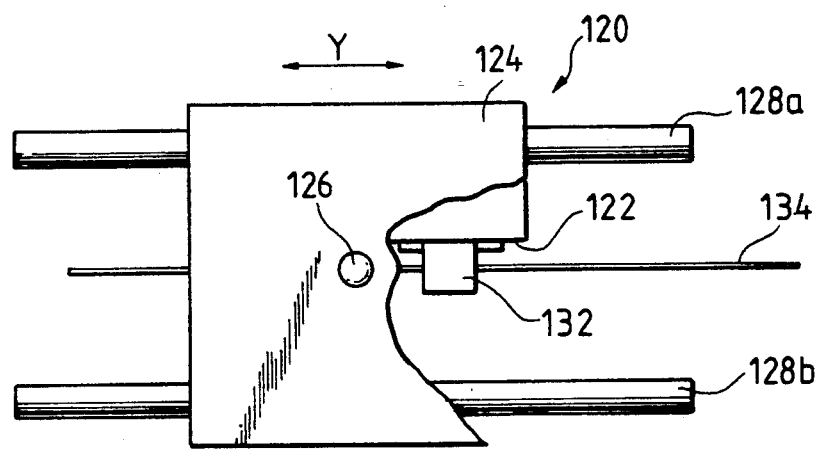
FIGS. 5A and 5B show yet still another embodiment in which the moving apparatus of the present invention is used in an optical information recording-reproducing apparatus.
Figure 5B:
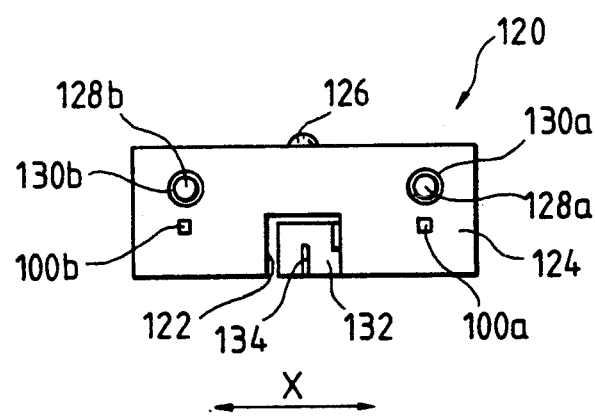

FIGS. 5A and 5B are a plan view and a side view, respectively, showing an embodiment of the moving apparatus for the optical head of the optical information recording-reproducing apparatus according to the present invention. In these figures, the direction Y is the direction of movement of the optical head, and the direction X is a direction perpendicular to the direction Y.

As shown in FIGS. 5A and 5B, the optical head 120 of the present embodiment includes a case 124 having a recess 122 formed at the bottom thereof. Drive means such as a linear motor or a DC motor, not shown, is connected to the case 124. An objective lens 126 is provided on the upper surface of the case 124. The objective lens 126 is supported for movement in the focusing direction and the tracking direction relative to an optical information recording medium (not shown) by a driving device for the objective lens 126 provided in the case 124.

Also, the optical head 120, as shown in FIG. 5A, is supported for movement in the direction Y by two guide rails 128a and 128b formed of a magnetic material and fixed to an optical information recording-reproducing apparatus (not shown). The guide rails 128a and 128b both have a circular cross-sectional shape, as shown in FIG. 5B. Bearings 130a and 130b corresponding to the rails 128a and 128b also have a circular shape.

As shown, a linear sensor 132 is provided in the recess 122 of the case 124 of the optical head 120. The linear sensor 132 has a groove portion in which a linear encoder plate 134 fixed to the optical information recording-reproducing apparatus is provided in such a manner as to be interposed. The optical head 120 can be access-moved to any position by the linear sensor 132 and the linear encoder plate 134.

Again, in such a case, by providing magnetic field producing means 100a and 100b below the bearings 130a and 130b, it is possible to decrease the mechanical resistance in the direction of movement of the optical head 120. Accordingly, the accuracy of the position servo of the movement of the optical head can be improved.

Also, in the embodiments shown above, there has been shown an example in which a linear motor, a DC motor or the like is used as the moving means for the optical head or the optical information recording medium which is a moving body, but the moving means for the moving body may also be a system in which a lead screw is rotated by a step motor to thereby move the moving body or a system in which the moving body is moved by a connected belt and thus, the moving means for the moving body is not specifically restricted, whereas it is particularly effective for the linear motor system. A linear motor has advantages that the control speed is great and that the kinetic mass is small, but if the mechanical resistance (friction) between the moving body and a guide therefor is great, the control of the electric current to the coil of the linear motor for the control of the moved position of the moving body will become complex. Consequently, the above-described moving apparatus of the present invention is particularly effective for the linear motor movement system.

As described above, in the moving apparatus for a moving body according to the present invention, permanent magnets which are magnetic field producing means are provided under the guide portion of the guide shafts for guiding the moving body, whereby magnetic attraction is cause to act on the guide shaft to thereby decrease the downward pressure force of the moving body to the guide shaft and thus, mechanical resistance by friction can be made small. Thereby, slide bearings which are inexpensive guide portions such as roulons become usable and damage to the slide shafts, which are guide shafts, caused by abrasion are mitigated.

Now, in the moving apparatus described above, magnetic field producing means is provided under the guide portion to thereby decrease the mechanical resistance of the movement of the moving body, but a linear motor which is a moving means can be utilized to decrease the mechanical resistance of the movement of the moving body. A system therefor will hereinafter be described.

Figure 6:
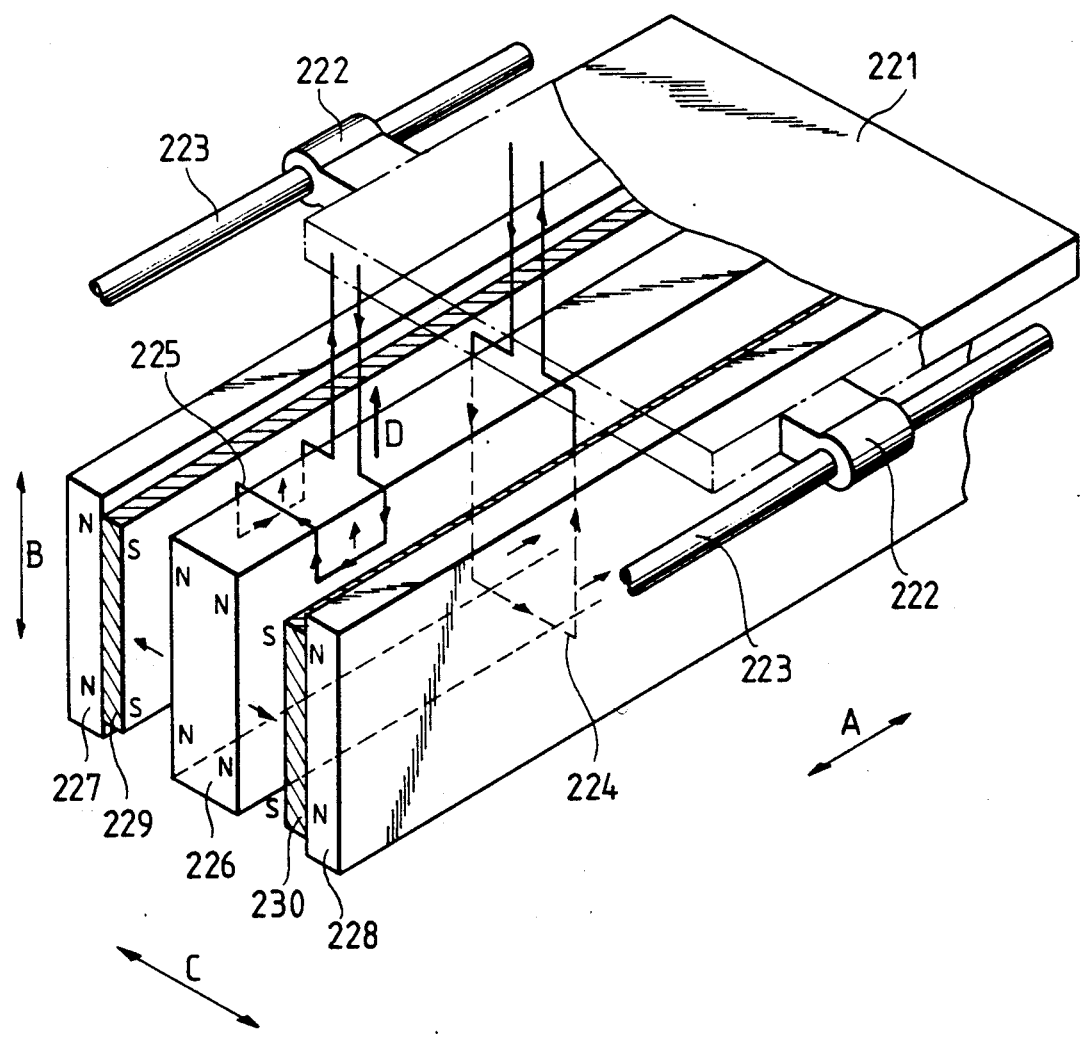
FIG. 6 shows another embodiment in which the moving apparatus of the present invention is used in an optical information recording-reproducing apparatus.

FIG. 6 shows an embodiment in which the moving apparatus of the present invention is used in an optical information reducing-reproducing apparatus, and more particularly, shows a system using a voice coil type linear motor.

Referring to FIG. 6, a carriage 221 which is a moving body on which an optical information recording medium is placed and held is slidably supported on slide shafts 223 through slide bearings 222 and is movable in the direction of arrow A. Below the carriage 221, coils 224 and 225 are mounted integrally with the carriage, and a yoke 226 extends through the coil 224 in the direction of arrow A which is the direction of movement of the carriage 221, and the coil 225 is constructed so as to nip the yoke 226. Magnetic field producing means comprising yokes 226, 227, 228 and permanent magnets 229, 230 is provided below the carriage 221, and the carriage and the magnetic field producing means are arranged in the direction of arrow B perpendicular to the direction of arrow a. Further, at the opposite sides of the yoke 226, yokes 227 and 228 are disposed in parallel and spaced apart relationship with the yoke 226, and permanent magnets 229 and 230 are disposed inside the yokes 227 and 228, and the opposite ends of the yokes 226, 227 and 228 are fixed to the apparatus body, not shown. The yokes 226, 227, 228 and the permanent magnets 229, 230 are arranged in the direction of arrow C perpendicular to the direction of arrow A and the direction of arrow B, and the direction of the line of magnetic flux produced is in the direction of arrow C. There is an optical head, not shown, above the carriage 221, and by the carriage 221 being moved, the medium surface of the optical information recording medium is scanned by a light beam.

When an electric current in the direction of the arrows flows to the coil 224, the carriage 221 receives a thrust and is moved thereby in the direction of arrow A relative to the yoke 226. On the other hand, when an electric current in the direction of the arrows flows to the coil 225, a thrust upward (in the direction of arrow D) relative to the yoke 226 is produced in that portion of the coil 225 through which the electric current flows in the direction of arrow A, and pushes up the entire carriage 221. Forces produced in the portion of the coil 225 through which the electric current flows in the directions other than the direction of arrow A offset each other and therefore have no influence upon the yoke 226. Accordingly, the carriage 221 is pushed up by the thrust produced in the coil 225 and the pressure force applied from above the carriage 221 to the slide shafts 223 is decreased.

Generally, if the mechanical accuracy of the slide bearings 222 and the slide shafts 223 is maintained practically sufficient, 95% or more of the mechanical load in the direction of movement of the carriage 221 caused when roulons are used is due to the friction produced by the pressure force which in turn is produced by the gravity of the carriage. Therefore, by adjusting the electric current flowing to the coil 225, it becomes possible to decrease the pressure force and decrease the mechanical load to the order of 30%.

According to the experiment, when the weight in the direction of arrow A is about 70 g and the resistance in the direction of movement is about 7 g, it is difficult in the speed servo control using PLL and frequency/voltage to obtain a gain which can be controlled almost stably at a speed of 60 mm/sec. If the inertial mass in the direction of arrow A is increased and the weight is selected on the order of 100 g, it will be possible to obtain a gain which suppresses jitter at 60 Hz by several percent while, on the other hand, the rising time for high speed will increase. According to the present embodiment, it becomes possible to decrease the movement of a weight 70 g in the direction of arrow a to a resistance of 3 g and to control jitter at 60–70 Hz at 60 mm/sec. to about 2%.

The gist of the present invention shown in the above-described embodiment is a moving apparatus for a moving body in which a carriage, which is a moving body, is movably supported by a guide portion guided by guide shafts and the carriage is moved along the guide shafts by a voice coil type linear motor, characterized in that coils are mounted on the carriage, magnetic field producing means is disposed below the carriage and the direction of the coils and the direction of the line of magnetic flux produced by the magnetic field producing means are determined so that an upward thrust relative to the magnetic field producing means is produced in the carriage when an electric current flows to the coils.

Figure 7:
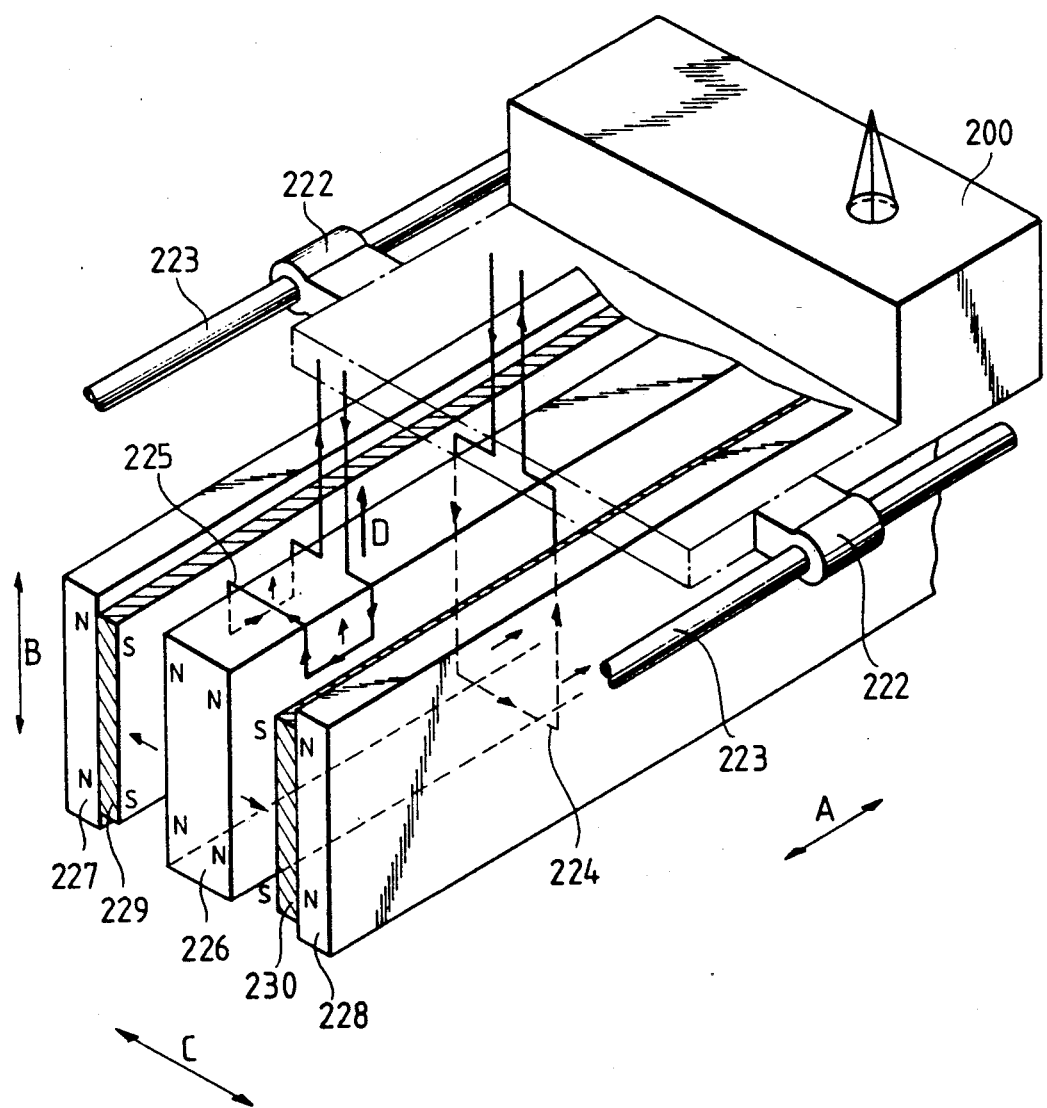
FIG. 7 shows still another embodiment in which the moving apparatus of the present invention is used in an optical information recording-reproducing apparatus.

While FIG. 6 has been described with respect to a case wherein the optical information recording medium is moved, the present invention is, of course also applicable to a case wherein the optical head is moved. An embodiment therefor is shown in FIG. 7. In FIG. 7, the reference numeral 200 designates an optical head and the other members are similar to those in the embodiment shown in FIG. 6 and therefore need not be described. Again, in this case, it is possible to produce an upward thrust in the optical head by the utilization of a linear motor to thereby decrease the mechanical resistance in the direction of movement of the optical head. Accordingly, the accuracy of the position servo of the movement of the optical head can be improved.

Figure 8:
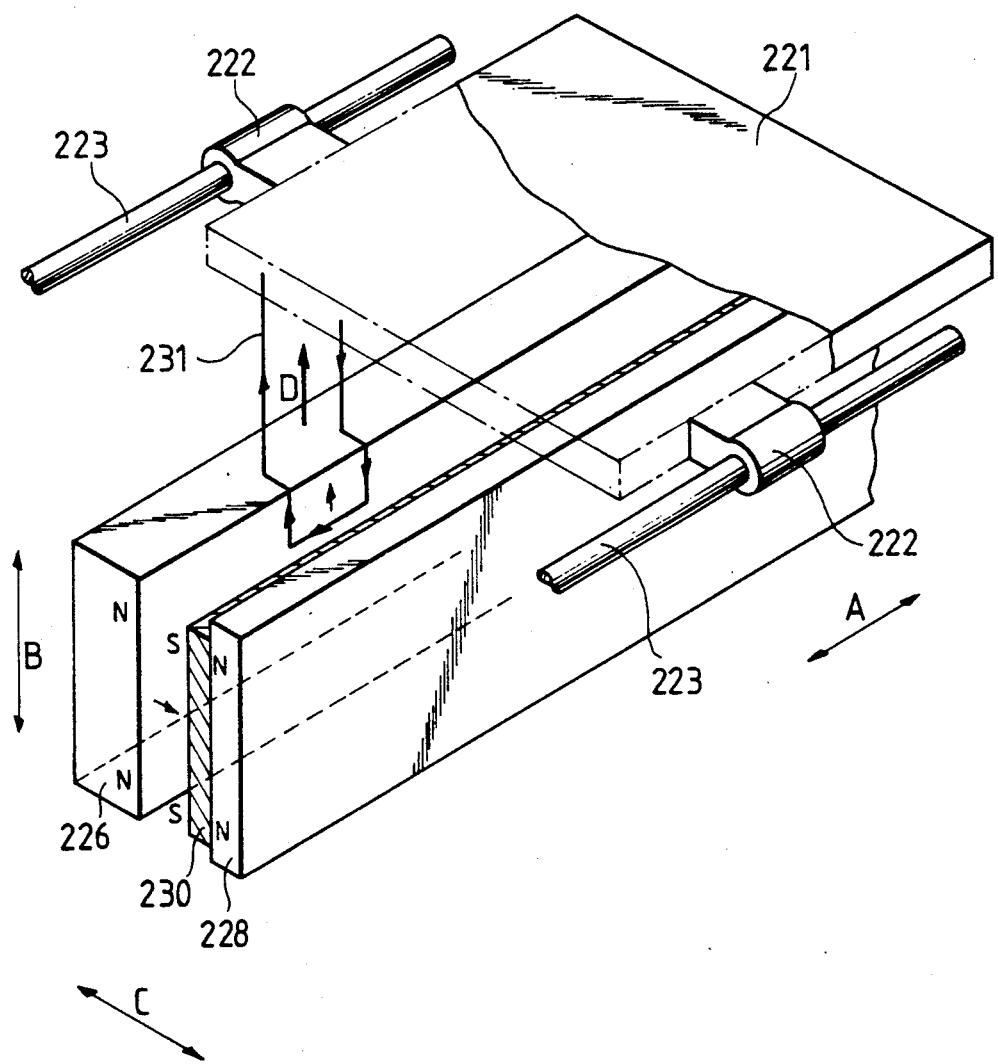
FIG. 8 shows yet still another embodiment in which the moving apparatus of the present invention is used in an optical information recording-reproducing apparatus, and particularly, shows a case wherein the moving apparatus is used as a floating apparatus.

While the moving apparatus for a moving body has been described in connection with FIGS. 6 and 7, a linear motor can also be utilized simply as a floating device for a body. An example of such is shown in FIG. 8. When an electric current in the direction of the arrows flows to a coil 231, a thrust upward (in the direction of arrow D) relative to a yoke 226 is produced in that portion of the coil 231 through which the electric current flows in the direction of arrow A and thus, the entire carriage 221 is pushed up. Forces produced in that portion of the coil 231 through which the electric current flows in the directions other than the direction of arrow A offset each other and therefore have no influence upon the carriage. Accordingly, the carriage 221 is pushed up by the thrust produced in the coil 231.

As described above, in the moving apparatus for a moving body according to the present invention, a coil for producing an upward thrust in the moving body is provided, whereby the pressure force of the moving body to the slide shafts which are guide shafts for guiding the moving body can be decreased and the mechanical resistance by friction can be made small. Thus, inexpensive slide bearings such as roulons become usable as a guide portion for the moving body.

What is claimed is:

1. An optical information recording-reproducing apparatus comprising:
   an optical head unit for effecting recording and/or reproduction of information on an optical information recording medium;
   holding means for holding the optical information recording medium, said holding means having a guide portion and having magnetic field producing means provided near the lower portion thereof;
   moving means for moving said holding means relative to said optical head unit; and
   a guide shaft for guiding said holding means for movement in a predetermined direction, said guide shaft being formed of a magnetic material.

2. A supporting device for supporting a body, said device comprising:
   a body;
   a coil mounted to said body, said coil having a path along which an electric current flows in a first direction; and
   magnetic field producing means disposed below said body in a second direction, the direction of the line of magnetic flux produced by said magnetic field producing means being a third direction orthogonal to the first direction and the second direction.

3. A supporting device according to claim 1, further comprising means for causing electric current to flow to said coil, to generate a force, causing said body to act upwardly on said magnetic field producing means.

4. A supporting device according to claim 2, wherein said magnetic field producing means comprises a permanent magnet.

5. A moving apparatus for moving a body, said apparatus comprising:
   a moving body;
   a coil mounted to said body, said coil having a path along which an electric current flows in a first direction and in a second direction orthogonal to the first direction; and
   magnetic field producing means disposed below said moving body in the second direction, the direction of the line of magnetic flux produced by said magnetic field producing means being a third direction orthogonal to the first direction and the second direction.

6. A moving apparatus according to claim 5, further comprising means for causing an electric current to flow to said coil, to generate a force, causing said moving body to act upwardly on said magnetic field producing means, and causing said moving body to act on said magnetic field producing means in the first direction.

7. A moving apparatus according to claim 5, wherein said magnetic field producing means comprises a permanent magnet.

8. A moving apparatus according to claim 5, wherein said moving body further comprises a guide portion, and said apparatus further comprising a guide shaft engaged with said guide portion to guide said moving body for movement in a predetermined direction.

9. An apparatus according to claim 5, wherein said coil comprises independently controlled first and second coils, said first coil having current flowing in the first direction and said second coil having current flowing in the second direction.

10. An optical information recording-reproducing apparatus comprising:
an optical head unit for effecting recording and/or reproduction of information on an optical information recording medium;
holding means for holding the optical information recording medium, said holding means having a coil mounted thereon, said coil having a path along which an electric current flows in a first direction; and
magnetic field producing means disposed below said holding means, said magnetic field producing means and said holding means being arranged in a second direction, the direction of the line of magnetic flux produced by said magnetic field producing means being a third direction orthogonal to the first direction and the second direction.

11. An optical information recording-reproducing apparatus comprising:
an optical head unit for effecting recording and/or reproduction of information on an optical information recording medium;
holding means for holding the optical information recording medium, said holding means having a coil mounted thereon, said coil having a path along which an electric current flows in a first direction and a second direction orthogonal to the first direction; and
magnetic field producing means disposed below said holding means, said magnetic field producing means and said holding means being arranged in the second direction the direction of the line of magnetic flux produced by said magnetic field producing means being a third direction orthogonal to the first direction and the second direction.

12. An optical information recording-reproducing apparatus according to claim 11, wherein said holding means further has a guide portion, and further comprising a guide shaft engaged with said guide portion to guide said holding means for movement in a predetermined direction.

13. An optical information recording-reproducing apparatus according to claim 11, further comprising means for causing an electric current to flow to said coil, generating a thrust to cause said holding means to act upwardly on said magnetic field producing means, and said holding means generating a force to act on said magnetic field producing means in the first direction.

14. An apparatus according to claim 11, wherein said coil comprises independently controlled first and second coils, said first coil having current flowing in the first direction and sad second coil having current flowing in the second direction.

15. An optical information recording-reproducing apparatus comprising:
an optical head unit for effecting recording and/or reproduction of information on an optical information recording medium, said optical head unit having a coil mounted thereon, said coil having a path along which an electric current flows in a first direction; and
magnetic field producing means disposed below said optical head unit, said magnetic field producing means and said optical head unit being arranged in a second direction, the direction of the line of magnetic flux produced by said magnetic field producing means being a third direction orthogonal to the first direction and the second direction.

16. An optical information recording-reproducing apparatus according to claim 15, wherein said optical head unit further has a guide portion, and further comprising a guide shaft engaged with said guide portion to guide said optical head unit for movement in a predetermined direction.

17. An optical information recording-reproducing apparatus according to claim 15, further comprising means for causing an electric current to flow to said coil, generating a thrust to cause said optical head unit to act upwardly on said magnetic field producing means, and said optical head unit generating a force to act on said magnetic field producing means in the first direction.

18. An optical information recording-reproducing apparatus comprising:
an optical head unit for effecting recording and/or reproduction of information on an optical information recording medium, said optical head unit having a coil mounted thereon, said coil having a path along which an electric current flows in a first direction and a second direction orthogonal to the first direction; and
magnetic field producing means disposed below said optical head unit, said magnetic field producing means and said optical head unit being arranged in the second direction, the direction of the line of magnetic flux produced by said magnetic field producing means being a third direction orthogonal to the first direction and the second direction.

19. An apparatus according to claim 18, wherein said coil comprises first and second coils, said first coil having current flowing in the first direction and said second coil having current flowing in the second direction.

20. An apparatus for moving a movable member, said apparatus comprising:
a movable member;
a coil mounted to said movable member, said coil having a path along which an electric current flows in a direction and a second direction perpendicular to the first direction; and
magnetic field generating means being arranged linearly along the first direction and proximate to said movable member, a direction of the line of magnetic flux generated by said magnetic field generating means being a third direction perpendicular to both the first direction and the second direction.

21. An apparatus according to claim 20, further comprising means for causing electric current to flow in said coil to generate a force acting upwardly on said movable member relative to said magnetic field generating means, and a force acting on said movable member in the first direction relative to said magnetic field generating means.

22. An apparatus according to claim 20, wherein said magnetic field generating means comprises a permanent magnet.

23. An apparatus according to claim 20, wherein said movable member comprises a guide portion, and further comprising a guide shaft to engage with said guide portion to movably guide said movable member in a predetermined direction.

24. An optical information recording and/or reproducing apparatus comprising:
a head unit for recording information on and/or reproducing information from an optical information recording medium;
holding means for holding the optical information recording medium, said holding means comprising a coil having a path along which electric current flows in a first direction and in a second direction perpendicular to the first direction; and
magnetic field generating means being arranged linearly along the firs direction and proximate to said holding means, the direction of the line of magnetic flux generated by said magnetic field generating means being a third direction perpendicular to both the first direction and the second direction.

25. An apparatus according to claim 24, wherein said holding means further comprises a guide portion, and further comprising a guide shaft to engage with said guide portion to movably guide said holding means in a predetermined direction.

26. An apparatus according to claim 24, further comprising means for causing electric current to flow in said coil to generate a force acting upwardly on said holding means relative to said magnetic field generating means, and a force acting on said holding means in the first direction relative to said magnetic field generating means.

27. An optical information recording and/or reproducing apparatus comprising:
an optical head unit for recording information on and/or reproducing information from an optical information recording medium, said optical head unit comprising a coil having a path along which current flows in a first direction and in a second direction perpendicular to the first direction; and
magnetic field generating means being ar ranged linearly along the first direction and proximate to said optical head unit, the direction of the line of magnetic flux generated by said magnetic field generating means being a third direction perpendicular to both the first direction and the second direction.

28. An apparatus according to claim 27, wherein said optical head unit further comprises a guide portion, and further comprising a guide shaft to engage with said guide portion to movably guide said optical head unit in a predetermined direction.

29. An apparatus according to claim 27, further comprising means for causing electric current to flow in said coil to generate a force acting upwardly on said optical head unit relative to said magnetic field generating means, and a force acting on said optical head unit in the first direction relative to said magnetic field generating means.

30. A moving apparatus for moving a body in a first direction, said apparatus comprising:
a moving body;
a coil mounted to said moving body, said coil having a path along which electric current flows in the first direction and in a second direction orthogonal to the first direction; and
magnetic field producing means disposed proximate to said moving body in the second direction, said magnetic field producing means being linearly arranged along the first direction, a direction of the line of magnetic flux produced by said magnetic field producing means being a third direction orthogonal to the first direction and the second direction;
guide means for guiding said moving body in the first direction; and
means for causing an electric current to flow to said coil, to generate a force, causing said moving body to act on said magnetic field producing means in the first direction and causing said moving body to act upwardly on said magnetic field producing means to reduce mechanical resistance created when said moving body is guided in the first direction by said guide means.

31. A moving apparatus according to claim 30, wherein the mechanical resistance created when said moving body is guided in the first direction by said guide means is frictional force.

* * * * *

UNITED STATES PATENT AND TRADEMARK OFFICE
CERTIFICATE OF CORRECTION

PATENT NO. : 5,101,398

DATED : March 31, 1992

INVENTOR(S) : Hiroshi Inoue, et al.

It is certified that error appears in the above-identified patent and that said Letters Patent is hereby corrected as shown below:

COLUMN 1

Line 49, "the" should be deleted.

COLUMN 2

Line 38, "resin" should read --resins,--; and
Line 48, "sufficiently constant speed cannot be kept," should read --speed cannot be kept sufficiently constant--.

COLUMN 4

Line 3, "is" should be deleted;
Line 10, "friction" should read --friction,--;
Line 16, "the" (first occurrence) should read --an-- and "weight of an" should read --weight of the--;
Line 18, "movement," should read --movement--;
Line 19, "stably" should read --stable--;
Line 24, "for," should read --for--;
Line 33, "iron piece 7" should read --iron piece 17--; and
Line 46, "grinded" should read --guided--.

COLUMN 6

Line 4, "cause" should read --caused--; and
Line 39, "arrow a." should read --arrow A.--.

UNITED STATES PATENT AND TRADEMARK OFFICE
CERTIFICATE OF CORRECTION

PATENT NO. : 5,101,398

DATED : March 31, 1992

INVENTOR(S) : Hiroshi Inoue, et al.

It is certified that error appears in the above-identified patent and that said Letters Patent is hereby corrected as shown below:

COLUMN 7

Line 25, "arrow a" should read --arrow A--.

COLUMN 8

Line 38, "claim 1," should read --claim 2,--.

COLUMN 10

Line 49, "a direction" should read --a first direction--.

COLUMN 11

Line 40, "ar ranged" should read --arranged--.

Signed and Sealed this

Twentieth Day of July, 1993

Attest:

MICHAEL K. KIRK

Attesting Officer     Acting Commissioner of Patents and Trademarks